United States Patent [19]
Kehl et al.

[11] Patent Number: 5,265,943
[45] Date of Patent: Nov. 30, 1993

[54] THROTTLE WITH PRESSURE LIMITING VALVE TO DAMP PRESSURE FLUCTUATIONS

[75] Inventors: Georg Kehl; Heinz Siegel, both of Stuttgart, Fed. Rep. of Germany

[73] Assignee: Robert Bosch GmbH, Stuttgart, Fed. Rep. of Germany

[21] Appl. No.: 953,378

[22] Filed: Sep. 30, 1992

[30] Foreign Application Priority Data

Sep. 30, 1991 [DE] Fed. Rep. of Germany ... 9112163[U]

[51] Int. Cl.$^5$ .......................... B60T 8/32; B60T 13/12
[52] U.S. Cl. ................ 303/87; 303/116.1; 303/113.1; 303/900; 303/901; 303/115.4
[58] Field of Search ............ 303/119.1, 87, 113.1, 303/113.2, 115.1, 115.4, 68–69, 115.5, 117.1, 119.2, 900, 901, 116.1, 116.2, 116.3; 137/112, 508

[56] References Cited
U.S. PATENT DOCUMENTS

| | | | |
|---|---|---|---|
| 3,774,976 | 11/1973 | Parsons | 303/115.5 |
| 4,919,495 | 4/1990 | Kircher et al. | 303/113.1 |
| 4,969,697 | 11/1990 | Lindenman | 303/68 X |
| 5,004,301 | 4/1991 | Yamada et al. | 303/115.4 |
| 5,020,864 | 6/1991 | Tanaka | 303/68 X |
| 5,031,969 | 7/1991 | Siegel | 303/87 X |
| 5,058,961 | 10/1991 | Mergenthal et al. | |
| 5,076,647 | 12/1991 | Grana et al. | 303/68 X |
| 5,167,442 | 12/1992 | Alaze et al. | 303/900 |

*Primary Examiner*—Douglas C. Butler
*Attorney, Agent, or Firm*—Edwin E. Greigg; Ronald E. Greigg

[57] ABSTRACT

An apparatus for damping pressure fluctuations in hydraulic motor vehicle systems with an anti-skid and/or traction control system, the apparatus comprises a throttle and a pressure limiting valve. The apparatus comprises a sleeve-like housing with a screen-like throttle body received in it along with a prestressed compression spring with which the throttle body is supported on the bottom of the housing. The housing and the throttle body are embodied as molded sheet-metal parts. On its bottom, the housing has an opening, with a valve seat, made by stamping without metal cutting, of a pressure limiting valve, which is engaged by the throttle body, which has a stamped bulge of rounded shape. A throttle opening of the throttle body, located in the bulge, is disposed coaxially with the larger-diameter opening of the housing. The apparatus can be used in hydraulic motor vehicle brake systems with an anti-skid and/or traction control system.

4 Claims, 2 Drawing Sheets

THROTTLE WITH PRESSURE LIMITING VALVE TO DAMP PRESSURE FLUCTUATIONS

BACKGROUND OF THE INVENTION

The invention is based on a throttle with a pressure limiting valve to damp pressure fluctuations in hydraulic motor vehicle brake systems with an anti-skid and/or traction control system. Such brake systems are equipped with a pulsatingly pumping high-pressure pump. On its output side, the pump communicates successively in the flow direction with a damper chamber and a throttle, and a pressure limiting valve is connected parallel to the throttle. By suitably adapting these elements of the brake system, pressure fluctuations originating in the pump can be lessened.

A device of this kind, which combines the function of the throttle and the pressure limiting valve, is already known (German Offenlegungsschrift 39 23 282, (U.S. Pat. No. 5,058,961), in which the housing and the throttle body are embodied as turned parts produced by metal-cutting techniques. Intersecting bores are also provided in the throttle body. The throttle body additionally has an eccentrically disposed throttle opening. This makes the known apparatus relatively expensive to manufacture.

Also, because of the disposition of the throttle opening, the throttle body is subject to an eccentric force engagement originating in hydraulic forces of the brake system pressure fluid.

OBJECT AND SUMMARY OF THE INVENTION

The apparatus according to the invention has an advantage over the prior art that it can be manufactured economically. As a result of the shaping of the throttle body region that cooperates with the housing valve seat, alignment errors are compensated for in a simple manner, and this improves the function of the apparatus. In addition, because of the disposition of the throttle opening relative to the housing opening, a balanced load on the throttle body is attained.

A relatively heavy-duty, low-wear valve seat is attained with a shaping disclosed hereinafter.

The embodiment disclosed has an advantage, while using little material, of assuring the axial guidance of the throttle body, with flow courses for pressure fluid created between the guide straps.

With a further feature of the invention a separate component for transmitting the spring force to the housing can be dispensed with, which makes manufacture of the apparatus still less expensive.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
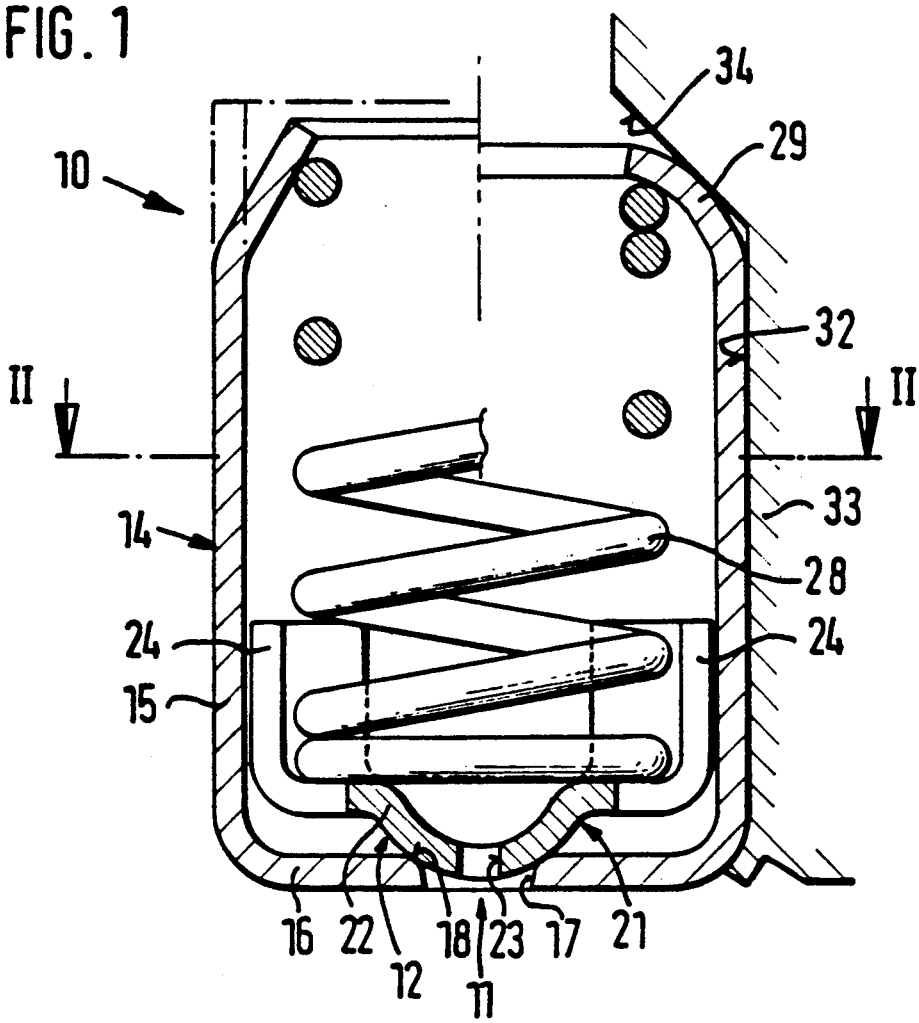
FIG. 1 is a longitudinal section through an apparatus for damping pressure fluctuations, comprising a throttle and a pressure limiting valve.

The apparatus 10 shown in the drawing includes a throttle 11, with a parallel-connected pressure limiting valve 12 (FIG. 1). The apparatus 10 is exposed to the flow of pressure fluid of a pulsatingly pumping high-pressure pump, not shown; the side facing into the flow is at the bottom in FIG. 1 and the trailing side is at the top.

The apparatus 10 has a sleeve-like housing 14, which is formed as a molded sheet-metal part by deep drawing. The housing 14 has a jacket wall 15 of circular-cylindrical cross section, and on the leading end it has a flat bottom 16 with a centrally disposed, circular-cylindrical opening 17. On the inside, the opening 17 changes into a curved valve seat 18, the cross section of which is defined as a quarter circle, of the pressure limiting valve 12. The valve seat 18 is produced without metal cutting, in a stamping process.

Figure 2:
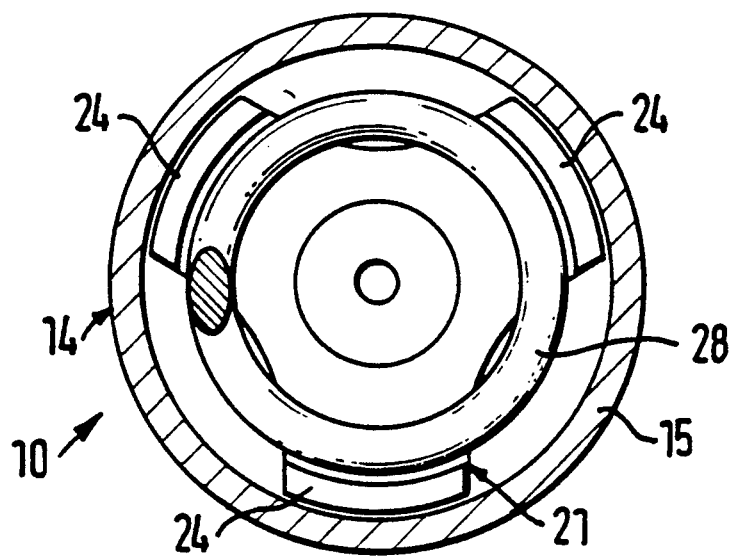
FIG. 2 is a cross section through the apparatus taken along the line II—II of FIG. 1.

A throttle body 21 is longitudinally displaceably received in the housing 14. The throttle body 21, which is also a molded sheet-metal part made by deep drawing, has a stamped bulge 22 of rounded shape pointing toward the bottom 16 of the housing 14. The stamped bulge 22, disposed centrally with respect to the throttle body 21, is provided with a throttle opening 23 disposed coaxially with the opening 17 in the housing 14. The throttle opening 23 has a very much smaller diameter than the opening 17. Three equally distributed guide straps 24 begin on the circumference of the throttle body 21, extending axially along the jacket wall 15 of the housing 14 with slight radial play (see FIG. 2).

A prestressed helical compression spring 28 is also received in the housing 14. The compression spring 28 engages the throttle body 21 on one end and presses it with its stamped bulge 22 against the valve seat 18 of the housing 14. On its other end, on the side remote from the bottom 16, the compression spring 28 is supported on a radially inwardly drawn crimped rim 29 of the housing 14. After the throttle body 21 and the compression spring 28 are placed into the housing 14, this crimped rim 29 is produced in a two-stage process, beginning at the cross section of the jacket wall 15 represented by dot-dashed lines in the left half of FIG. 1. In a first stage, in which a mandrel (not shown) holds down the compression spring 28, the crimped rim 29 is subjected to a shaping of the kind represented by solid lines in the left half of FIG. 1. In a second machining stage, in which holding down the compression spring 28 may be omitted, the form of the crimped rim 29 shown in the right half of FIG. 1 is produced. In this completed state, the intended prestressing of the compression spring 28 is also attained.

The apparatus 10 is received fittingly in a conically shouldered receiving bore 32 of a housing 33, for example a pump housing (see the right half of FIG. 1). The crimped rim 29 is supported in a pressure-fluid-tight manner on the conical portion 34 of the receiving bore 32. The fastening of the apparatus 10 is attained on the side of the bottom 16 by bracing of the housing 33.

The pressure fluid pumped by the pump flows through the opening 23 of the throttle 11, and the compression spring 28 keeps the throttle body 21, with its stamped bulge 22, in contact with the valve seat 18 of the housing 14. Only if the throttle opening 23 becomes plugged with foreign bodies inadvertently contained in the pressure fluid do forces caused by the pressure fluid and engaging the bulge 22 of the throttle body 21 located inside the opening 17 effect lifting of the throttle body 21 from the valve seat 18, contrary to the prestressing of the compression spring 28. The opened pressure limiting valve 12 now permits a flow through the apparatus 10, bypassing the throttling 11, the pressure fluid takes its course along the bulge 22 and between the guide straps 24 to the trailing side.

Figure 3:
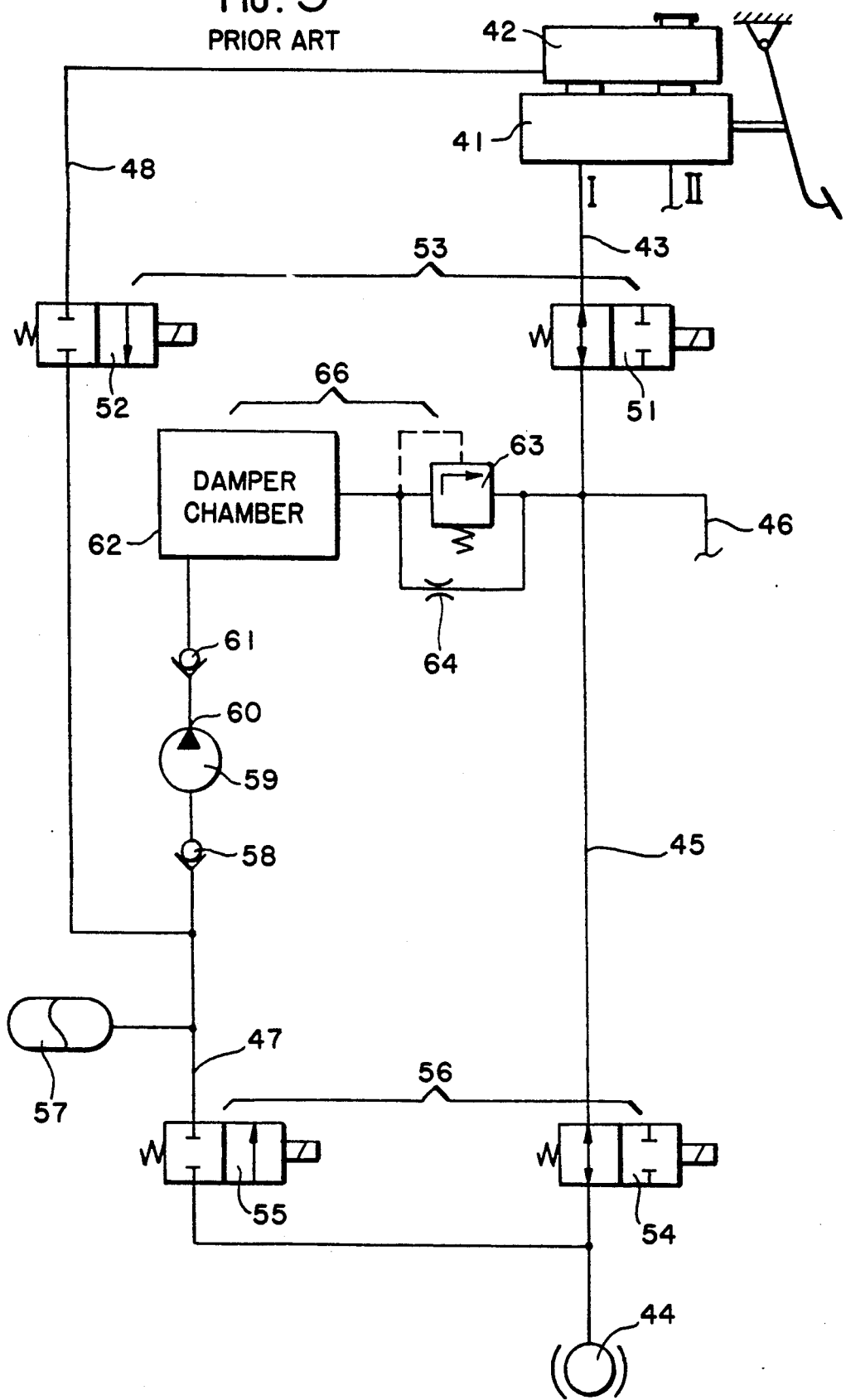
FIG. 3 illustrates a diagram of a vehicle hydraulic brake system having an anti-skid and traction control system.

FIG. 3 illustrates a diagram of a vehicle hydraulic brake system including an anti-skid and traction control system. The system 40 includes pedal-actuated master brake cylinder 41 with a supply container 42 for pressure fluid for generating brake pressure in brake circuits I and II. The brake circuit I has a master brake line 43, which is subdivided into brake lines 45 and 46 leading to wheel brakes 44. (Only one wheel brake 14 is shown in brake circuit I; similarly, because it is not essential to the disclosure of the invention, brake circuit II has not been shown here.) A feed line 47 is provided parallel to the brake line 45. An intake line 48 branches off from the feed line 47 and leads to the supply container 42 of the master brake cylinder 41.

A first 2/2-way valve 51 is disposed in the master brake line 43, and a second 2/2-way valve 52 is disposed in the intake line 48. The two multi-position valves 51 and 52 form a first pressure control valve assembly 53 for reducing drive slip, i.e., for traction control, at driven vehicle wheels. A third 2/2-way valve 54 is disposed in the brake line 45, and a fourth 2/2-way valve 55 is disposed in the feed line 47. These valves form a second pressure control valve assembly 56 for avoiding wheel lock, or skidding, during braking.

Viewed in the flow direction, a reservoir 57 for pressure fluid is connected to the feed line 47. A first check valve 58, a feed pump 59 for pressure fluid, and following its outlet 60 a second check valve 61 are incorporated in succession into the portion following the connection of the intake line 48 to the feed line 47. These are followed by a damper chamber 62 and a pressure limiting valve 63 having a throttle 64 connected parallel to them. The damper chamber 62, the pressure limiting valve 63 and the throttle 64 form an apparatus 66 for damping pressure fluctuations engendered by the operation of the pump 59.

In normal braking operation, the multi-position valves 51, 52, 54 and 55 assume the positions shown: Brake pressure generated in the master brake cylinder 41 becomes operative in the wheel brake 44 (as well as in the other brakes of the two brake circuits I and II). The check valve 65 that is optionally associated with the throttle 64 prevents a buildup of brake pressure in this process in the damper chamber 62. If wheel locking threatens to occur during braking, then by means of an electronic control device, not shown, the multi-position valve 54 is switched into its blocking position, and the multi-position valve 55 is switched into its open position. The brake pressure in the wheel brake 44 can be reduced to an extent predetermined by the control device through the feed line 47 in the reservoir 57, by the reception of pressure fluid. At the same time, the pump 59 is switched on by the control device, and the pressure fluid is pumped through the damper chamber 62 and throttle 64 back tot he master brake cylinder 41. In this process the apparatus 66 reduces the pressure fluctuations brought about by the pump 29.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A throttle with a pressure limiting valve for damping pressure fluctuations in hydraulic motor vehicle brake systems with an anti-skid and/or traction control system, having a sleeve-like housing (14) that on a leading end includes a bottom (16) having a circular-cylindrical opening (17) in a middle of the bottom, with a valve seat (18) on an inside face of said circular cylindrical opening, a throttle body (21), received longitudinally movably in the housing (14), with a throttle opening (23) associated with the circular cylindrical opening (17) of the housing (14), and having a prestressed compression spring (28) disposed in the housing (14), with which compression spring the throttle body (21) is supported on the bottom (16) of the housing (14), the housing (14) and the throttle body (21) are molded sheet metal parts; the valve seat (18) of the housing (14) is engaged by the throttle body (21), the throttle body has a stamped bulge (22) of rounded shape toward the throttle opening, which is formed by stamping without metal cutting; and the throttle opening (23) of the throttle body (21) is disposed coaxially with the circular cylindrical opening (17) of the housing (14).

2. An apparatus as defined by claim 1, in which the valve seat (18) of the housing (14) is defined at least approximately in a form of a quarter circle in cross section.

3. An apparatus as defined by claim 1, in which three equally distributed guide straps (24) begin circumferentially from the throttle body (21) and extend axially along a jacket wall (15) of the housing (14).

4. An apparatus as defined by claim 1, in which the housing (14), remote from the bottom, has a radially inwardly drawn-in crimped rim (29), with which the throttle body (21) and the compression spring (28) are retained inside the housing (14).

* * * * *